United States Patent
Yamaguchi et al.

(10) Patent No.: US 8,966,618 B2
(45) Date of Patent: Feb. 24, 2015

(54) LICENSE MANAGEMENT SYSTEM, AND COMPUTER-READABLE RECORDING MEDIUM STORING LICENSE MANAGEMENT PROGRAM

(75) Inventors: Keiko Yamaguchi, Osaka (JP); Takashi Araki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 854 days.

(21) Appl. No.: 12/313,639

(22) Filed: Nov. 21, 2008

(65) Prior Publication Data
US 2009/0228976 A1    Sep. 10, 2009

(30) Foreign Application Priority Data
Mar. 5, 2008  (JP) .................. 2008-054518

(51) Int. Cl.
*G06F 21/62* (2013.01)
*G06F 21/10* (2013.01)

(52) U.S. Cl.
CPC .............. *G06F 21/10* (2013.01); *G06F 21/105* (2013.01)
USPC ................... 726/20; 726/10; 726/16; 726/21; 713/185

(58) Field of Classification Search
CPC .................................... G06F 21/105
USPC ....................... 726/16, 20; 713/185
See application file for complete search history.

(56) References Cited

U.S. PATENT DOCUMENTS

| | | | | |
|---|---|---|---|---|
| 4,992,978 | A * | 2/1991 | Thornton ........................ | 718/107 |
| 6,718,486 | B1 * | 4/2004 | Roselli et al. ................... | 714/41 |
| 7,680,743 | B2 * | 3/2010 | Peinado et al. ................. | 705/59 |
| 7,707,646 | B2 * | 4/2010 | Leuschner et al. .............. | 726/30 |
| 7,865,947 | B2 * | 1/2011 | Fanton et al. ................... | 726/16 |
| 2001/0013099 | A1 * | 8/2001 | Haruki .......................... | 713/202 |
| 2003/0088516 | A1 * | 5/2003 | Remer et al. .................... | 705/59 |
| 2003/0152222 | A1 * | 8/2003 | Nakano et al. ................. | 380/201 |
| 2003/0204723 | A1 * | 10/2003 | Narin et al. .................... | 713/165 |
| 2004/0045000 | A1 | 3/2004 | Hara | |
| 2004/0143760 | A1 * | 7/2004 | Alkove et al. ................. | 713/201 |
| 2004/0249815 | A1 * | 12/2004 | Lee .................................. | 707/9 |
| 2006/0161972 | A1 * | 7/2006 | Cromer et al. ................... | 726/5 |
| 2007/0100969 | A1 * | 5/2007 | Hu ................................ | 709/220 |

FOREIGN PATENT DOCUMENTS

| | | |
|---|---|---|
| CN | 1489043 | 4/2004 |
| JP | 10-111797 | 4/1998 |
| JP | 2001-005659 | 1/2001 |
| JP | 2007-316938 | 12/2007 |

\* cited by examiner

*Primary Examiner* — Jung Kim
*Assistant Examiner* — Ngoc D Nguyen
(74) *Attorney, Agent, or Firm* — Jordan and Hamburg LLP

(57) ABSTRACT

Provided is a license management system comprising: a license check device that independently operates on a platform; and an information processing device that is connected to the license check device, in which the license check device includes: a license check unit that checks for presence or absence of a license of the information processing device; a first start unit that starts the license check unit in response to a call instructed by the platform; and a calling unit that calls, when the license check unit determines that the license is present, the information processing device, and in which the information processing device includes: an information processing unit that performs a specific information processing; and a second start unit that starts the information processing unit only in response to the call from the license check device.

4 Claims, 5 Drawing Sheets

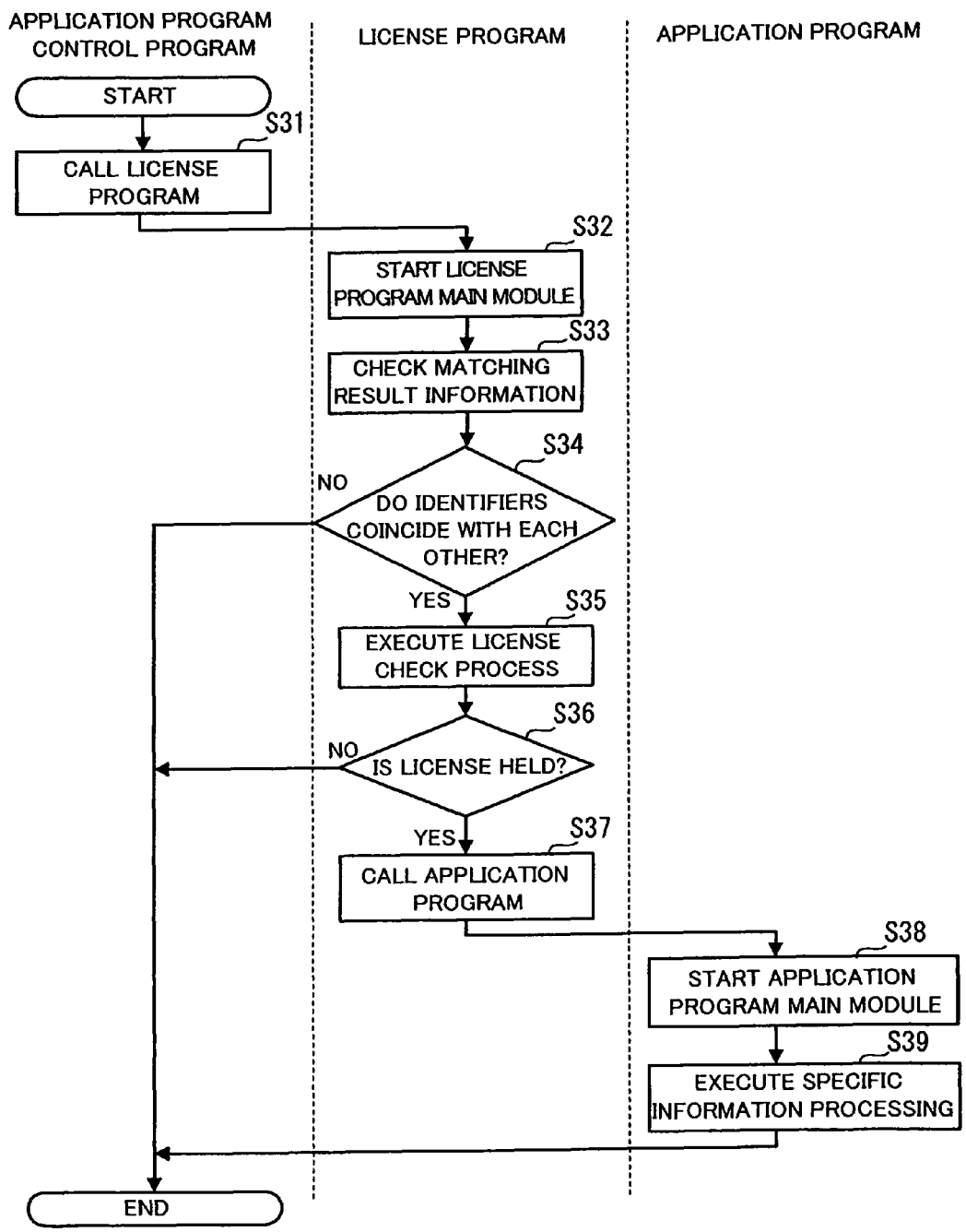

LICENSE MANAGEMENT SYSTEM, AND COMPUTER-READABLE RECORDING MEDIUM STORING LICENSE MANAGEMENT PROGRAM

INCORPORATION BY REFERENCE

This application is based upon and claims the benefit of priority from the corresponding Japanese Patent Application No. 2008-054518, filed Mar. 5, 2008, the entire contents of which is incorporated herein by reference.

BACKGROUND OF THE INVENTION

1. Field of the Invention

The present invention relates to a license management system performing a management process of a license (license agreement) of software programs such as application programs, and a computer-readable recording medium storing a license management program.

2. Description of the Related Art

Conventionally, in a computer network system including a license management computer and application program execution computers, a license management process for application programs is performed according to the following method.

Specifically, the license management computer holds license information on the application programs and a license matching program. The license information includes: 1. identification information on an application program; 2. identification information on a licensee or identification information on an application program execution computer used by the licensee; and 3. the number of users permitted to use the application program. The license matching program is a program which matches the license information in response to an inquiry from the application program execution computer.

On the other hand, the application program execution computer holds an application program. The application program includes an application program main module, and an inquiry program. The inquiry program is a program which inquires the license management program about presence or absence of a license of the application program.

When a user (licensee) operates the application program execution computer thereby instructing execution of the application program, the application program execution computer calls the application program, and inquires, according to the inquiry program, the license management computer about the presence or absence of a license of the application program. On this occasion, the identification information on the application program, the identification information on the licensee, and the like are transmitted from the application program execution computer to the license management computer. Then, the license management computer matches, according to the license matching program, the identification information on the application program, the identification information on the licensee, and the like, which have been transmitted from the application program execution computer, with the license information held by the license management computer. As a result, the presence or absence of a license of the application program held by the application program execution computer is determined. When a license of the application program is present, the license management computer notifies the application program execution computer of the presence, and, in response to the notification, execution of the application program main module starts on the application program execution computer. On the other hand, when a license of the application program is absent, the license management computer notifies the application program execution computer of the absence, and, in response to the notification, execution of the application program main module is rejected on the application program execution computer.

Moreover, as the license management process for application programs, a license management computer distributes license information to application program execution computers in advance, and the application program execution computer, upon execution of an application program, matches the license information (refer to Patent Document 2 for more detail). According to this process, the application programs held by the application program execution computer include an application program main module, and a license matching program. Then, when a user (licensee) operates the application program execution computer thereby instructing execution of the application program, the application program execution computer calls the application program, matches license information according to the license matching program, and, only when a license is present, starts execution of the application program main module.

SUMMARY OF THE INVENTION

A license management system according to an embodiment of the present invention comprises a license check device that independently operates on a platform, and an information processing device that is connected to the license check device. The license check device comprises a license check unit, a first start unit and a calling unit. The license check unit checks for presence or absence of a license of the information processing device. The first start unit starts the license check unit in response to a call instructed by the platform. The calling unit calls, when the license check unit determines that the license is present, the information processing device. Moreover, the information processing device comprises an information processing unit, and a second start unit.

The information processing unit performs a specific information processing. The second start unit starts the information processing unit only in response to the call from the license check device.

A computer-readable recording medium according to another embodiment of the present invention stores a license management program for causing a computer to function as a license check device that independently operates on a platform. The license management program causes the computer to function as a license check unit, and a first start unit and a calling unit. The license check unit operates on the platform and checks for a license of an information processing device performing a specific information processing. The first start unit starts the license check unit in response to a call instructed by the platform. The calling unit calls, when the license check unit determines that the license is present, the information processing device.

In this text, the terms "comprising", "comprise", "comprises" and other forms of "comprise" can have the meaning ascribed to these terms in U.S. Patent Law and can mean "including", "include", "includes" and other forms of "include".

Additional features and advantages are described herein, and will be apparent from the following Detailed Description and the figures.

BRIEF DESCRIPTION OF THE DRAWINGS

In the accompanying drawings:

FIG. 6 shows a flowchart of an application program execution process.

DETAILED DESCRIPTION OF THE PREFERRED EMBODIMENTS

A description will now be given of embodiments of the present invention with reference to drawings.

System Configuration

Figure 1:
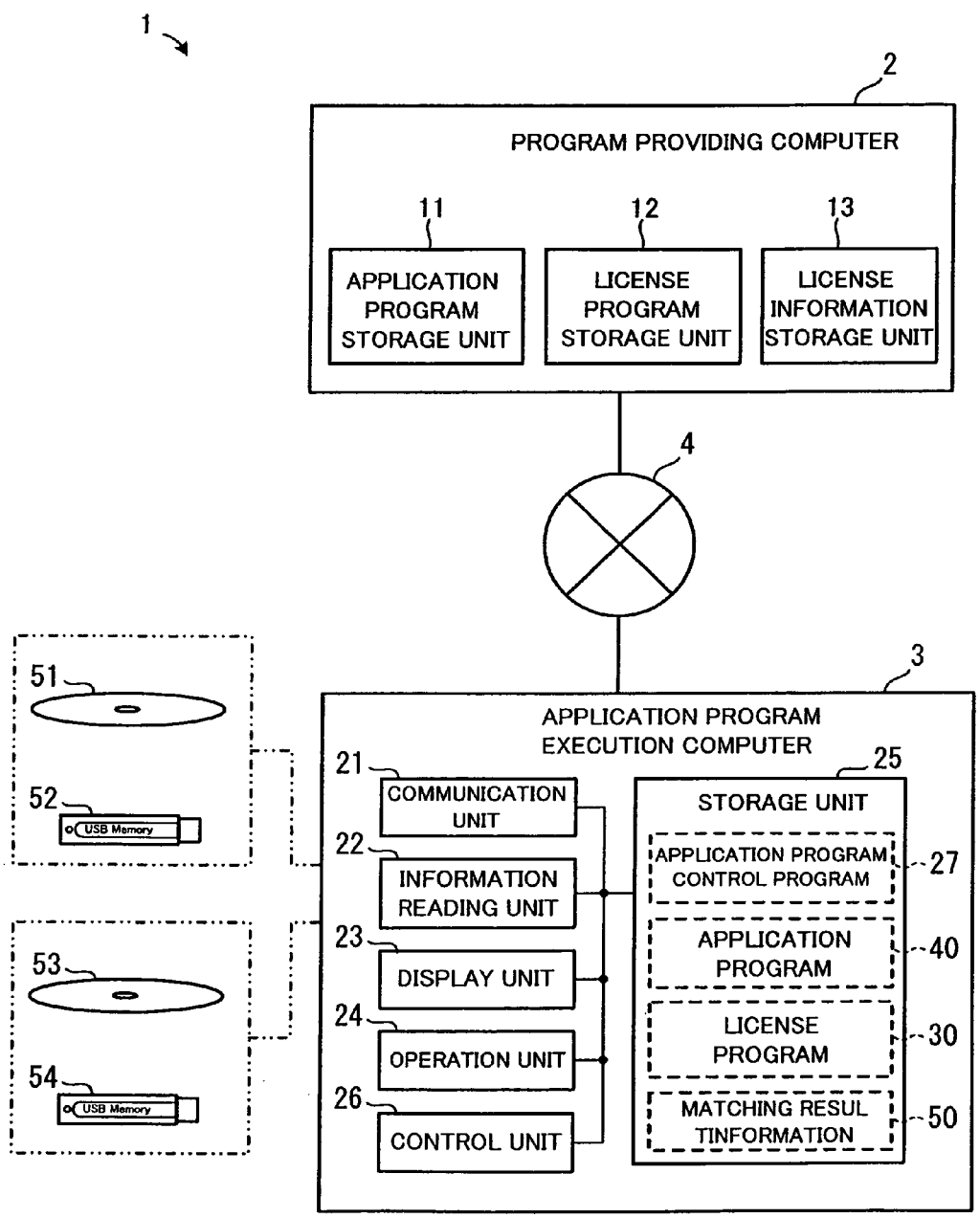
FIG. 1 shows a block diagram of a computer network system including an application program execution computer which is a license management system according to an embodiment of the present invention.

FIG. 1 shows a computer network system. In FIG. 1, a computer network system 1 includes a program providing computer 2, and an application program execution computer 3 as a license management system, and both of them are connected with each other via a computer network 4 such as the Internet.

The program providing computer 2 (program providing device) is installed in a business office of an application program provider, for example, and provides users with an application program 40 and a license program 30.

On the other hand, the application program execution computer 3 is installed in a business office of an application program user (referred to as user hereinafter), for example, and serves as a license management device by performing a process defined by the license program 30 provided by the application program provider. Moreover, the application program execution computer 3 serves as an information processing device by performing a process defined by the application program 40. In other words, as described later, the application program execution computer 3 performs, before performing the process defined by the application program 40, the process defined by the license program 30, thereby checking whether the information processing device (application program execution computer 3) used by the user has a license (license agreement) of the application program 40. Then, only when the application program execution computer 3 has a license, the application program execution computer 3 performs the process defined by the application program 40.

The application program execution computer 3 includes a communication unit 21, an information reading unit 22, a display unit 23, an operation unit 24, a storage unit 25, and a control unit 26, and the respective units are connected with one another via a bus, resulting in a configuration in which the respective units can communicate signals with one another.

The communication unit 21 connects the application program execution computer 3 to the computer network 4, thereby controlling communication between the application program execution computer 3 and the program providing computer 2. The communication unit 21 is a communication circuit for connecting to an Internet line, for example.

The information reading unit 22 reads information recorded on recording media such as optical disks 51, 53, and universal serial bus (USB) memories 52, 54. The information reading unit 22 is an optical disk drive or a USB connection circuit, for example.

The display unit 23 is a liquid crystal display, for example. The operation unit 24 includes multiple operation switches.

In the storage unit 25, an application program control program 27 is stored in advance. Moreover, in the storage unit 25, the application program 40 is stored by an application program installation process, and the license program 30 and matching result information 50 are stored by a license program installation process. The storage unit 25 is a rewritable storage medium, for example, and is more specifically, a hard disk or a flash memory.

The application program control program 27 is a computer program which controls installation/uninstallation of the application program 40 and the license program 30, calling/finishing of the license program 30, and finishing of the application program 40, and corresponds to an application platform. For example, the application program control program 27 is a part of an operating system.

The control unit 26 performs processes defined by the application program control program 27, the license program 30, and the application program 40. The control unit 26 includes a central processing unit (CPU), a read only memory (ROM), and a random access memory RAM). The ROM stores a computer program (such as a boot loader) which starts the application program control program 27. The RAM is used as a working memory when the CPU performs the processes defined by the application program control program 27, the license program 30, and the application program 40.

License Program

Figure 2:
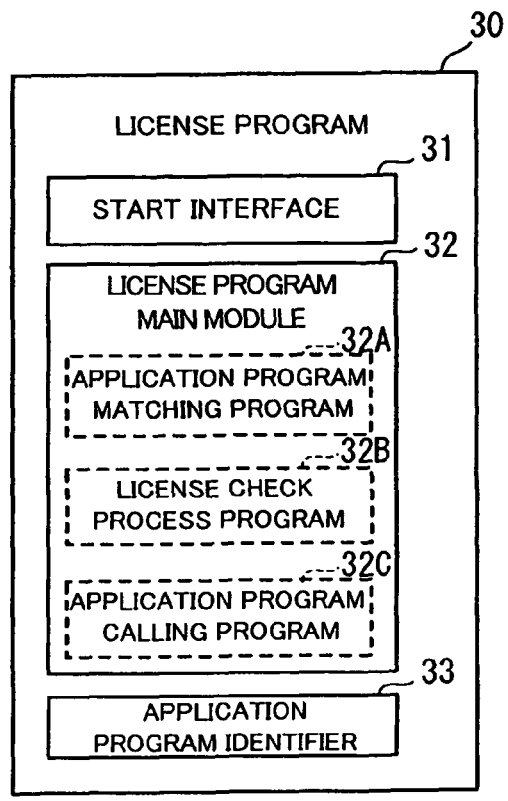
FIG. 2 shows a block diagram illustrating a configuration of a license program.

FIG. 2 shows a configuration of the license program 30. The license program 30 is independently treated on the application program control program 27 (platform). For example, the license program 30 is treated as an independent file or an independent set of files by the application program control program 27 (platform) and the like. The license program 30 is an independent program separated from the application program control program 27 and the application program 40. The license program 30 can be installed and uninstalled independently of the application program control program 27 and the application program 40. Moreover, the license program 30 can be called by the application program control program 27.

The license program 30 is a computer program which causes the control unit 26 to function as a license check device. In more detail, the license program 30 causes, by causing the control unit 26 to perform an application program matching process, a license check process, and an application program calling process, the control unit 26 to function respectively as a matching unit, a license check unit, and a calling unit.

The application program matching process is a process which matches an application program identifier 33 held by the license program 30 and an application program identifier 43 held by the application program 40 with each other. The license check process is a process which checks whether, based on a result of the matching performed by the application program matching process, a license of the application program 40 is present on the information processing device (application program execution computer 3) used by the user. The application program calling process is a process which calls the application program 40 only when the license check process has determined that the information processing device (application program execution computer 3) has a license.

Moreover, the license program 30 includes a start interface 31, a license program main module 32, and the application program identifier 33.

The start interface 31 is a computer program which starts the license program main module 32, and causes the control unit 26 to function as a first start unit. The start interface 31 can be called by the application program control program 27.

The license program main module 32 includes an application program matching program 32A, a license check process program 32B, and an application program calling program 32C respectively as sub-programs. The application program matching program 32A is a computer program which causes the control unit 26 to perform the application program matching process. The license check process program 32B is a computer program which causes the control unit 26 to perform the license check process. The application program calling program 32C is a computer program which causes the control unit 26 to perform the application program calling process.

The application program matching program 32A starts immediately after the start of the license program main module 32. The application program matching program 32A causes the control unit 26 to perform a process which checks whether matching result information 50 is stored in the storage unit 25, matches, when matching result information 50 is not stored in the storage unit 25, the application program identifier 33 held by the license program 30 and the application program identifier 43 held by the application program 40 with each other, stores information on whether the application program identifier 33 and the application program identifier 43 coincide with each other as matching result information 50 in the storage unit 25, and ends the process. In this case, the license program main module 32 finishes without starting either the license check process program 32B or the application program calling program 32C. The application program matching program 32A causes, when matching result information 50 is stored in the storage unit 25, the control unit 26 to perform a process which reads the matching result information 50, checks whether the application program identifier 33 and the application program identifier 43 coincide with each other, and starts, when the application program identifier 33 and the application program identifier 43 coincide with each other, the license check process program 32B and the application program calling program 32C, or, when the application program identifier 33 and the application program identifier 43 do not coincide with each other, finishes without starting either the license check process program 32B or the application program calling program 32C.

The application program identifier 33 is first identification information used to identify an application program to which a license is issued. For example, the application program identifier 33 is a number unique to an application program to which a license is issued.

Application Program

Figure 3:
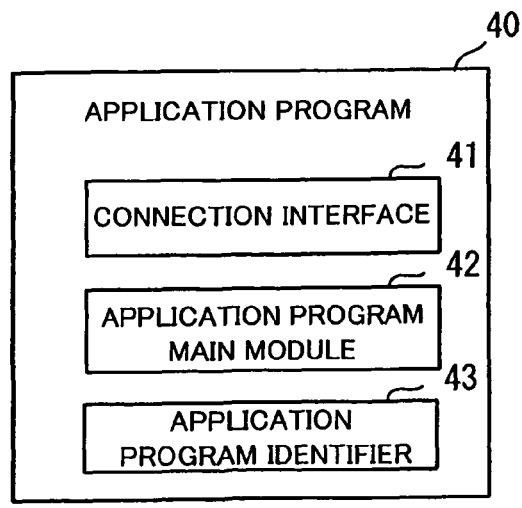
FIG. 3 shows a block diagram illustrating a configuration of an application program.

FIG. 3 shows a configuration of the application program 40. For example, the application program 40 is treated as an independent file or an independent set of files by the application program control program 27 (platform) and the like. Moreover, the application program 40 can be installed and uninstalled independently. However, the application program 40 cannot be called by the application program control program 27. Only the license program 30 can call the application program 40.

The application program 40 is a computer program which causes the application program execution computer 3 to function as the information processing device, and includes a connection interface 41, an application program main module 42, and the application program identifier 43.

The connection interface 41 is a computer program which starts the application program main module 42, and causes the control unit 26 to function as a second start unit. Only the application program calling program 32C of the license program 30 can call the connection interface 41. For example, the connection interface 41 is uniquely defined by an application vendor which produces the license program 30 and the application program 40, and, thus, the application program control program 27 cannot directly call the application program 40.

The application program main module 42, by causing the control unit 26 to perform a specific information processing, causes the control unit 26 to act as an information processing unit.

The application program identifier 43 is second identification information used to identify the application program 40. For example, the application program identifier 43 is a number unique to the application program 40.

Application Program Installation Process

Figure 4:
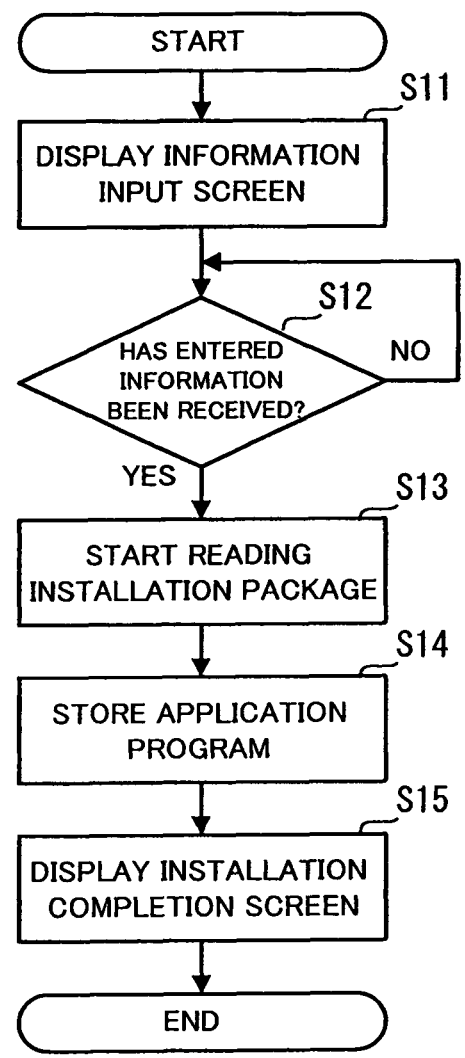
FIG. 4 shows a flowchart of an application program installation process.

FIG. 4 shows the application program installation process. The application program installation process is a process which installs the application program 40 on the application program execution computer 3.

When the user operates the operation unit 24 of the application program execution computer 3 thereby entering an instruction to start the application program installation process to the application program execution computer 3, the control unit 26 of the application program execution computer 3 starts the application program installation process.

As shown in FIG. 4, in the application program installation process, first, the control unit 26 of the application program execution computer 3, according to the application program control program 27, displays an installation information input screen on the display unit 23 (Step S11).

In an application program storage unit 11 of the program providing computer 2, an installation package of the application program 40 is stored. This installation package contains the application program 40. When the user operates the operation unit 24 thereby entering information which indicates a stored location (such as a uniform resource locator (URL)) of the installation package of the application program 40, and an instruction to start installing, to the application program execution computer 3, the control unit 26, according to the application program control program 27, receives the entered information ("YES" in Step S12).

Then, the control unit 26 of the application program execution computer 3, according to the application program control program 27, controls the communication unit 21 thereby establishing a communication between the application program execution computer 3 and the program providing computer 2. Then, the control unit 26, according to the application program control program 27, makes an access to the installation package of the application program 40 stored in the application program storage unit 11 of the program providing computer 2 based on the information indicating the stored location of the installation package of the application program 40, and starts reading the installation package (Step S13). As a result, the installation package of the application program 40 is downloaded from the program providing computer 2 to the application program execution computer 3.

Then, the control unit 26 of the application program execution computer 3, according to the application program control program 27, stores the application program 40 contained in the downloaded installation package in the storage unit 25

(Step S14). For example, the application program 40 is disposed in a predetermined directory (folder) set in advance in the storage unit 25.

Then, the control unit 26 of the application program execution computer 3, according to the application program control program 27, displays an installation completion screen on the display unit 23 (Step S15).

License Program Installation Process

Figure 5:
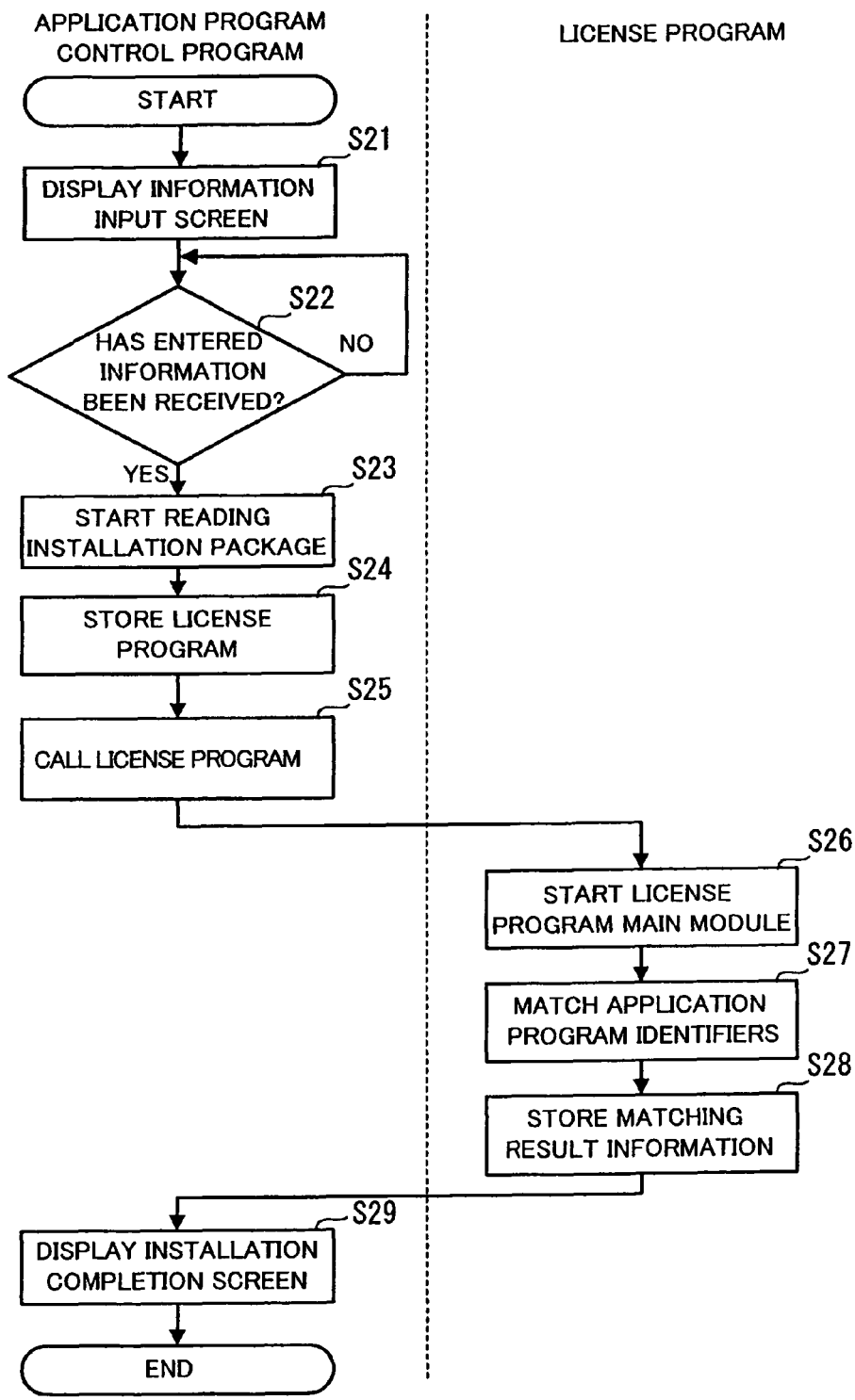
FIG. 5 shows a flowchart of a license program installation process.

FIG. 5 shows the license program installation process. The license program installation process is a process which installs the license program 30 on the application program execution computer 3.

When the user operates the operation unit 24 of the application program execution computer 3 thereby entering an instruction to start the license program installation process to the application program execution computer 3, the control unit 26 of the application program execution computer 3 starts the license program installation process.

As shown in FIG. 5, in the license program installation process, first, the control unit 26 of the application program execution computer 3, according to the application program control program 27, displays an installation information input screen on the display unit 23 (Step S21).

In a license program storage unit 12 of the program providing computer 2, an installation package of the license program 30 is stored. This installation package contains the license program 30. When the user operates the operation unit 24 thereby entering information which indicates a stored location (such as a URL) of the installation package of the license program 30, and an instruction to start installing, to the application program execution computer 3, the control unit 26, according to the application program control program 27, receives the entered information ("YES" in Step S22).

Then, the control unit 26 of the application program execution computer 3, according to the application program control program 27, controls the communication unit 21 thereby establishing a communication between the application program execution computer 3 and the program providing computer 2. Then, the control unit 26, according to the application program control program 27, makes an access to the installation package of the license program 30 stored in the license program storage unit 12 of the program providing computer 2 based on the information indicating the stored location of the installation package of the license program 30, and starts reading the installation package (Step S23). As a result, the installation package of the license program 30 is downloaded from the program providing computer 2 to the application program execution computer 3.

Then, the control unit 26 of the application program execution computer 3, according to the application program control program 27, stores the license program 30 contained in the downloaded installation package in the storage unit 25 (Step S24).

Then, the control unit 26 of the application program execution computer 3, according to the application program control program 27, calls the license program 30 (Step S25). As a result, the license program 30 starts.

When the license program 30 starts, the control unit 26 of the application program execution computer 3, according to the license program 30, first starts the start interface 31. Then, the control unit 26, according to the start interface 31, starts the license program main module 32 (Step S26).

Then, the control unit 26 of the application program execution computer 3, according to the license program main module 32, starts the application program matching program 32A. Then, the control unit 26, according to the application program matching program 32A, checks whether matching result information 50 is stored in the storage unit 25.

Matching result information 50 is generated by the application program matching program 32A, which is a part of the license program main module 32 contained in the license program 30. Thus, when the license program installation process is first performed, matching result information 50 has not been generated yet, and, thus is not stored in the storage unit 25.

When matching result information 50 is not stored in the storage unit 25, the control unit 26 of the application program execution computer 3, according to the application program matching program 32A, matches the application program identifier 33 held by the license program 30 and the application program identifier 43 held by the application program 40 with each other (Step S27), and stores information on whether the application program identifier 33 and the application program identifier 43 coincide with each other as matching result information 50 in the storage unit 25 (Step S28). As a result, the application program matching program 32A finishes, and the license program main module 32 thus finishes.

Then, the control unit 26 of the application program execution computer 3, according to the application program control program 27, displays an installation completion screen on the display unit 23 (Step S29).

Application Program Execution Process

FIG. 6 shows an application program execution process. The application program execution process is a process for executing the application program 40.

When the user operates the operation unit 24 of the application program execution computer 3 thereby entering an instruction to execute the application program 40 to the application program execution computer 3, the control unit 26of the application program execution computer 3 starts the application program execution process.

As shown in FIG. 6, in the application program execution process, the control unit 26 of the application program execution computer 3, first, according to the application program control program 27, calls the license program 30 (Step S31). As a result, the license program 30 starts.

When the license program 30 starts, the control unit 26, according to the license program 30, first starts the start interface 31. Then, the control unit 26, according to the start interface 31, starts the license program main module 32 (Step S32).

Then, the control unit 26 of the application program execution computer 3, according to the license program main module 32, starts the application program matching program 32A. Then, the control unit 26, according to the application program matching program 32A, checks whether matching result information 50 is stored in the storage unit 25. Matching result information 50 is generated in the above-mentioned license program installation process, and is stored in the storage unit 25. Thus, when the license program 30 has been installed by way of the license program installation process, matching result information 50 is stored in the storage unit 25.

When matching result information 50 is stored in the storage unit 25, the control unit 26 of the application program execution computer 3, according to the application program matching program 32A, reads the matching result information 50, thereby checking whether the application program identifier 33 and the application program identifier 43 coincide with each other (Step S33). In the matching result information 50, information indicating whether the application program identifier 33 and the application program identifier 43 coincide with each other is recorded. Thus, without matching the application program identifier 33 and the application program identifier 43 with each other, it is possible, only by reading the matching result information 50, to quickly check whether the application program identifier 33 and the application program identifier 43 coincide with each other.

As a result, when the application program identifier 33 and the application program identifier 43 coincide with each other ("YES" in Step S34), the control unit 26 of the application program execution computer 3, according to the license program main module 32, starts the license check process program 32B. Then, the control unit 26, according to the license check process program 32B, performs the license check process (Step S35).

The license check process is performed as follows. In other words, a license information storage unit 13 of the program providing computer 2 stores license information on the application program 40. On the other hand, the license check process program 32B also records license information on the application program 40. Moreover, the license check process program 32B records information indicating the stored location of the license information (such as URL) on the application program 40, which is stored in the license information storage unit 13 of the program providing computer 2. The control unit 26 of the application program execution computer 3, according to the license check process program 32B, controls the communication unit 21 thereby establishing a communication between the application program execution computer 3 and the program providing computer 2. Then, the control unit 26, according to the license check process program 32B, based on the information indicating the stored location of the license information on the license program 30, makes an access to the license information on the application program 40 stored in the license information storage unit 13 of the program providing computer 2, and reads this license information. Then, the control unit 26, according to the license check process program 32B, matches the read license information, and the license information on the application program 40 recorded in the license check process program 32B with each other, thereby determining whether the license relating to the application program 40 is held by the information processing device (application program execution computer 3).

As a result of this determination, when the license relating to the application program 40 is held by the information processing device (application program execution computer 3) ("YES" in Step S36), the control unit 26 of the application program execution computer 3, according to the license program main module 32, starts the application program calling program 32C. Then, the control unit 26, according to the application program calling program 32C, calls the application program 40 (Step S37). As a result, the application program 40 starts. For example, the application program calling program 32C records a name of a predetermined directory (folder) in the storage unit 25 set in advance to dispose the application program 40, and the application program calling program 32C refers to the predetermined directory name, thereby calling the application program 40.

When the application program 40 starts, the control unit 26 of the application program execution computer 3, according to the application program 40, first starts the connection interface 41. Then, the control unit 26, according to the connection interface 41, starts the application program main module 42 (Step S38).

Then, the control unit 26, according to the application program main module 42, performs a specific information processing (Step S39).

On the other hand, in Step S34, when the application program identifier 33 and the application program identifier 43 do not coincide with each other ("NO" in Step S34), the control unit 26 of the application program execution computer 3, according to the license program main module 32, finishes the license program main module 32 without starting either the license check process program 32B or the application program calling program 32C. As a result, the application program 40 does not start.

Moreover, in Step S36, when the control unit 26 determines that the license relating to the application program 40 is not held by the information processing device (application program execution computer 3) ("NO" in Step S36), the control unit 26 of the application program execution computer 3, according to the license program main module 32, finishes the license program main module 32 without starting the application program calling program 32C. As a result, the application program 40 is not executed.

Unistallation and Reinstallation of License Program

On the other hand, the license program 30 installed on the application program execution computer 3 can be uninstalled. In other words, when the user operates the operation unit 24 of the application program execution computer 3 thereby entering an instruction to uninstall the license program 30 to the application program execution computer 3, the control unit 26 of the application program execution computer 3, according to the application program control program 27, deletes the license program 30 and the matching result information 50 from the storage unit 25. Moreover, after the license program 30 is uninstalled from the application program execution computer 3, by performing the license program installation process, it is possible to reinstall the license program 30 on the application program execution computer 3.

As described above, on the application program execution computer 3, the license program 30 is independently treated on the application program control program 27 (operating system). Then, the license program 30 can be installed and uninstalled independently of the application program control program 27 and the application program 40. As a result, after the application program 40 and the license program 30 are respectively installed on the application program execution computer 3, when a form of license relating to the application program 40 is changed, only by installing a new license program 30 provided with the license check process program which can check whether a license after the change in form is present or absent, it is possible to enable a continuous use of the application program 40 by the user (licensee). In other words, when the form of license relating to the application program 40 has been changed, it is not necessary to reinstall the application program 40, and it is not necessary to change the application program control program 27 either.

Thus, with the application program execution computer 3, it is possible to easily adapt to various forms of license, and frequent changes in the form of license. As a result, on the part of the user, it is possible to increase convenience and to reduce load imposed on the user, which relates to the use of the application program 40, and, on the part of the provider of the application program 40, to increase flexibility and quality of the service for providing the application program 40.

Moreover, on the application program execution computer 3, only the license program 30 can call the application program 40. As a result, even when the application program 40 is installed on the application program execution computer 3, when the license program 30 is not installed on the application program execution computer 3, the user cannot operate the application program execution computer 3 to call the application program 40.

Thus, by preventing a party which does not have the license from obtaining the license program 30, it is possible to prevent the party without the license from operating the application program execution computer 3 to call the application program 40, resulting in promoting the prevention of the unauthorized use of the application program 40.

Moreover, on the application program execution computer 3, the license program 30 holds the application program identifier 33, and the application program 40 holds the application program identifier 43, and the license program 30 matches the application program identifier 33 and the application program identifier 43 with each other, and recognizes that, when both of them coincide with each other, the application program 40, installed on the application program execution computer 3 is to be licensed. In other words, the license program 30 confirms that the application program execution computer 3 as the information processing device has the license of the application program 40. As a result, it is possible for the license program 30 to perform the license check process for the application program 40, and for the license program 30 to call the application program 40 easily and precisely.

According to the above-mentioned embodiment, the description has been given of the example in which, when the application program 40 and the license program 30 are to be installed on the application program execution computer 3, those programs are downloaded from the program providing computer 2 to the application program execution computer 3. However, the present invention is not limited to this case. For example, as shown in FIG. 1, when the application program 40 is to be installed on the application program execution computer 3, the application program 40 may be transferred from the optical disk 51 or the USB memory 52 on which the application program 40 is recorded to the application program execution computer 3. Moreover, when the license program 30 is to be installed on the application program execution computer 3, the license program 30 may be transferred from a different optical disk 53 or a different USB memory 54 on which the license program 30 is recorded to the application program execution computer 3.

Moreover, according to the above-mentioned embodiment, in the license program installation process, the description has been given of the example in which the license program 30 matches the application program identifier 33 and the application program identifier 43 with each other. However, the present invention is not limited to this case. For example, the application program 40 may perform this matching. In this case, in Step S27 of the license program installation process shown in FIG. 5, the control unit 26 of the application program execution computer 3, according to the license program 30, calls the application program 40, notifies, according to the license program 30, the application program 40 of the application program identifier 33, and requests the application program 40 for matching the application program identifier 33 and the application program identifier 43 with each other.

Moreover, the type of the information processing performed by the application program 40 is not specifically limited. Further, the application program execution computer 3 is not limited to the personal computer, and may be a copying machine, a printer, a multifunction device, a video equipment, a home appliance, a medical appliance, and other device or system incorporating a computer.

Moreover, the present invention may be properly modified within a scope without departing from the gist or idea of the invention legible from the claims and the whole specification, and a license management system and a computer-readable recording medium storing a license management program accompanying such a modification are also included in the technical idea of the present invention.

According to the above-mentioned embodiment, the present invention can be summarized in part as follows. A license management system according to an embodiment of the present invention comprises a license check device that independently operates on a platform, and an information processing device that is connected to the license check device. Moreover, the license check device comprises a license check unit, a first start unit and a calling unit. The license check unit checks for presence or absence of a license of the information processing device. The first start unit starts the license check unit in response to a call instructed by the platform. The calling unit calls, when the license check unit determines that the license is present, the information processing device. Moreover, the information processing device comprises an information processing unit, and a second start unit. The information processing unit performs the specific information processing. The second start unit starts the information processing unit only in response to the call from the license check device.

On this occasion, the specific information processing may be performed by the application program held by the information processing device.

With the above configuration, when a form of license relating to the application program needs to be changed, only by replacing the license check device which the license management system presently includes to a new license check device which includes license check means which can check the absence or presence of a license after the change in the form, it is possible to easily reflect the change in the form of license to the license management process. In other words, in order to reflect the change in the form of license to the license management process, it is not necessary to change the information processing device (such as the application program) and the platform entirely or to a large extent. As a result, it is possible to realize a license management system which can adapt to various license forms or frequent changes in license form.

Moreover, even when the information processing device is present on the platform, when the license check device is not present, the user cannot operate the platform to call the information processing device. Thus, by preventing a party which does not have the license from obtaining the license check device, it is possible to prevent the party without the license from operating the platform to call the information processing device, resulting in promoting the prevention of the unauthorized use of the information processing device.

In addition to the above configuration, the license check device may comprise a first storage unit that stores the first identification information used for identifying a subject of a license, and the information processing device may comprise a second storage unit that stores the second identification information used for identifying the information processing device itself. Moreover, one of the license check device and the information processing device may comprise the matching unit that matches the first identification information and the second identification information with each other. In this case, the license check unit checks, based on a result of the matching performed by the matching unit, whether the information processing device has a license.

With the above configuration, it is possible for the license check device to easily and precisely perform the license check process for the information processing device, or for the license check device to easily and precisely call the information processing device.

A computer-readable recording medium according to another embodiment of the present invention is stored a license management program for causing a computer to function as a license check device that independently operates on a platform. The license management program causes the computer to function as: a license check unit, and a first start unit and a calling unit. The license check unit operates on the platform and checks for a license of an information processing device performing a specific information processing. The start unit starts the license check unit in response to a call instructed by the platform. The calling unit calls, when the license check unit determines that the license is present, the information processing device.

On this occasion, the specific information processing may be performed by an application program held by the information processing device.

With the above configuration, when a form of license relating to the application program needs to be changed, only by replacing the license check device which the license management system presently includes to a new license check device which includes license check means which can check the absence or presence of a license after the change in the form, it is possible to easily reflect the change in the form of license to the license management process. In other words, in order to reflect the change in the form of license to the license management process, it is not necessary to change the information processing device (such as the application program) and the platform entirely or to a large extent. As a result, it is possible to realize a license management system which can adapt to various license forms or frequent changes in license form.

Moreover, even when the information processing device is present on the platform, when the license check device is not present, a user cannot operate the platform to call the information processing device. Thus, by preventing a party which does not have the license from obtaining the license check device, it is possible to prevent the party without the license from operating the platform to call the information processing device, resulting in promoting the prevention of the unauthorized use of the information processing device.

Moreover, in addition to the above configuration, the computer may be caused to function as a matching unit that matches first identification information used for identifying a subject of a license and second identification information used for identifying the information processing unit with each other. In this case, the license check unit checks, based on a result of the matching performed by the matching unit, whether the information processing device has a license.

With the above configuration, it is possible for the license check device to easily and precisely perform the license check process for the information processing device, or for the license check device to easily and precisely call the information processing device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A license management system comprising:
   an information processing device; and
   a license check device that independently operates on a platform independently of the information processing device, and that is operatively connected to the information processing device through the platform, in which
   the license check device comprises:
      a license check unit that checks for presence or absence of a license of the information processing device;
      a first start unit that starts the license check unit in response to a call instructed by the platform;
      a calling unit that calls, when the license check unit determines that the license is present, the information processing device; and
      a first storage unit that stores a license program including first identification information used for identifying a subject of a license, first license information, and a location of second license information stored on a program providing computer, and
   in which
   the information processing device comprises:
      an information processing unit that performs a specific information processing based on an application program downloaded from the program providing computer;
      a second start unit that starts the information processing unit only in response to the call from the license check device; and
      a second storage unit that stores the application program which program includes second identification information used for identifying the information processing device itself,
   one of the license check device and the information processing device further comprising a matching unit that matches the first identification information and the second identification information with each other, and matches the first license information and the second license information, respectively,
   wherein the license check unit checks, based on a result of the matching performed by the matching unit, whether the information processing device has a license,
   wherein the matching unit stores information on whether the first identification information and the second identification information coincide with each other as matching result information in a third storage unit when the license program is installed,
   wherein the matching unit, when the matching result information is stored in the third storage unit, in an execution process of the application program, reads the matching result information from the third storage unit, and checks whether the first identification information and the second identification information coincide with each other,
   wherein when the first identification information and the second identification information coincide with each other, as determined by the composition of the matching result information,
      the matching unit reads the second license information from the location of the second license information stored on the program providing computer and matches the first license information and the second license information,
      the license check unit checks whether the information processing device has the license based on a result of the matching of the first license information and the second license information by the matching unit, and
      the calling unit calls the information processing device as a result of the license check unit determining that the license is present based on the matching of the first license information and the second license information and does not call the information processing device when the license check unit determines that the license is not present based on a result of the matching of the first licence information and the second license information, and wherein when the first identification information and the second identification information do not coincide with each other, as determined by the composition of the matching result information, the calling unit does not call the information processing device.

2. The license management system according to claim 1, wherein the specific information processing is performed by the application program held by the information processing device.

3. A non-transitory computer-readable recording medium storing a license management program that manages, by using a license check device that operates on a platform independently of an information processing device operatively connected with the license check device through the platform, a license of the information processing device connected to the license check device, the license management program causing a computer to function as;

- a license check unit that checks for presence or absence of the license of the information processing device which performs a specific information processing based on an application program downloaded from a program providing computer, and would store a first license, and a location of a second license information;
- a first start unit that starts the license check unit in response to a call instructed by the platform;
- a calling unit that calls, when the license check unit determines that the license is present, the information processing device; and
- a matching unit that matches first identification information used for identifying a subject of a license and second identification information used for identifying the information processing device with each other, and matches the first license information and the second license information, respectively, wherein the license unit checks, based on the result of the matching performed by the matching unit, whether the information processing device has a license, wherein the matching unit stores information on whether the first identification information and the second identification information coincide with each other as matching result information in a third storage unit when the license program is installed, and wherein the matching unit, when the matching result information is stored in the third storage unit in an execution process of the application program, reads the matching result information from the third storage unit, and checks whether the first identification information and the second identification information coincide with each other, wherein when the first identification information and the second identification information coincide with each other, as determined by the composition of the matching result information,

- the matching unit reads the second license information from a location on the program providing computer and matches the first license information and the second license information,
- the license check unit checks whether the information processing device has the license based on result of the matching of the first license information and the second license information by the matching unit, and
- the calling unit calls the information processing device as a result of the license check unit determining that the license is present based on the result of the first license information and the second license information and does not call the information processing device as a result of the license check unit determining that the license is not .resent used on the result of the matching of the first license information and the second license information, and wherein when the first identification information and the second identification information do not coincide with each other, as determined by the composition of the matching result information, the calling unit does not call the information processing device.

4. The non-transitory computer-readable recording medium storing a license management program according to claim 3, wherein the specific information processing is performed by the application program held by the information processing device.

* * * * *